United States Patent [19]
Itoh et al.

[11] 3,727,982
[45] Apr. 17, 1973

[54] METHOD OF ELECTRICALLY DESTROYING CONCRETE AND/OR MORTAR AND DEVICE THEREFOR

[75] Inventors: Yoshishige Itoh, Kitatamagun, Tokyo; Masatada Kawamura, Hoya-City, Tokyo; Yoshio Kasai, Funabashi-City, Chiba-prefecture, all of Japan

[73] Assignee: Fuji Motors Corporation, Tokyo, Japan

[22] Filed: Mar. 8, 1971

[21] Appl. No.: 121,710

[30] Foreign Application Priority Data

Mar. 20, 1970 Japan ................................45/23098

[52] U.S. Cl. ..................................299/14, 219/10.41
[51] Int. Cl. ............................E21c 37/18, H05b 5/08
[58] Field of Search ..........................299/14; 175/16; 219/10.41, 10.43

[56] References Cited

UNITED STATES PATENTS 3,520,053 7/1970 Hinton et al. ..................219/10.41 X
3,580,637 5/1971 Itoh et al. ...............................299/14

FOREIGN PATENTS OR APPLICATIONS 933,744 8/1963 Great Britain .........................299/14

*Primary Examiner*—Ernest R. Purser
*Attorney*—Fidelman, Wolffe, Leitner and Hiney

[57] ABSTRACT

This invention relates to a method of electrically destroying a ferroconcrete body which comprises steps of conducting an alternating magnetic flux generated at an exciting coil to a ferromagnetic material present in the inner part of a ferroconcrete body or conducting an alternating magnetic flux generated at an exciting coil connecting capacitors in parallel to a part or entire part of a coil to said ferromagnetic material thereby to constitute a controlled magnetic induction circuit mainly including said ferromagnetic material and magnetic inductor, and raising the temperature of said ferromagnetic material, and a device therefor.

9 Claims, 13 Drawing Figures

METHOD OF ELECTRICALLY DESTROYING CONCRETE AND/OR MORTAR AND DEVICE THEREFOR

SUMMARY OF THE INVENTION

This invention relates to method of destroying a concrete in which a ferromagnetic material is present in the inner part, for example, such as a ferro-concrete body, and a device therefor.

A method of destruction of a compact mass by introducing electro-magnetic induction is shown in the Japanese Patent Gazette, Sho 38-14634.

In the conventional method it involves such defects that it is necessary to carry out a very labor-taking operation of making holes in portions to be destroyed and further an effective electromagnetic induction heating cannot be expected. This is because in this method it is only noticed to introduce a ferromagnetic material into holes at portions to be destroyed and heat said material with the high-frequency electromagnetic induction, and no consideration has been taken into the magnetic circuit, and therefore the magnetic flux generates the leakage of magnetism, and the leaked magnetic flux constitutes a magnetic circulating circuit only in the exciting coil generating the magnetic flux or makes a detour to the magnetic circuit other than the heating object, whereby it is very difficult to concentrate the generated magnetic flux to the object portion without dispersing it.

According to the present invention, it is not only unnecessary to make holes in concrete and introduce a ferromagnetic material into said holes but since the circuit conducting the magnetic flux is provided rationally, it can reduce the leaked magnetic flux and the dispersion of the magnetic flux and concentrate the magnetic flux on the ferromagnetic material at a portion to be destroyed, and therefore the ferromagnetic material can be extremely effectively heated, and, accordingly, destruction of concrete becomes extremely easy.

The French Pat. No. 918,321 shows a method of wrecking a ferroconcrete body by making two ends of the embedded reinforcement in the concrete naked and conducting large electric current between the two naked parts so that the reinforcement is heated and easily separated from the boundary concrete. The inventors of the present invention had an experience of such ferroconcrete body wrecking by the direct flowing method and confirmed that it is a valuable method, but at the same time we found that it has the following defects:

a. In a ferroconcrete body, the embedded reinforcement parts are almost connected with lap joint and it is difficult to make sufficient electricity flow through the reinforcement for wrecking the ferroconcrete body, b. Even when the reinforcement has no lap joint connection, it is difficult to find the position to be made naked in the embedded reinforcement because the reinforcement is sometimes bent at its end parts such as a beam, c. Even when a proper position is precisely found, it is difficult to dig a hole and make the embedded reinforcement part naked by hammering, etc.

d. It is necessary to use some heavyweight electric instruments including an expensive frequency converter.

This invention can heat the embedded reinforcement by another method which is theoretically different from the above written direct flowing method. The present method can cover not only the whole wrecking work of ferroconcrete body by itself, but also it can make a preparation work for the main wrecking work by the direct flowing method such as making the embedded reinforcement parts naked or making partial wrecking of the ferroconcrete body for overturning and separating its parts from the main body.

The first feature of the present invention resides in conducting an alternating magnetic flux generated at an exciting coil provided on the surface part which is the nearest from a ferromagnetic material present in the inner part of a concrete thereby to constitute a controlled magnetic induction circuit mainly including said ferromagnetic material and magnetic inductor and raising the temperature of said ferromagnetic material thereby to facilitate the destruction of the concrete or the like.

In such a case, it is impossible to make the magnetic inductor contact with the reinforcement as in ordinary cases because the reinforcement is embedded in the concrete at some depth from its wall surface. The present invention has as an object the finding of some good conditions for producing efficient magnetic induction under these circumstances and making strong heat action by a simple apparatus.

The second feature of the present invention resides in that an exciting coil is provided on the surface part of a ferroconcrete body which is nearest from the embedded ferromagnetic body so as to produce a magnetic flux which passes in a magnetic circulating circuit containing not only the magnetic inductor in the exciting coil but also a part of the above said ferromagnetic body, in that the exciting coil has at least two poles separated from each other, and in that a part or entire part of the exciting coil is connected in parallel with a capacitor so as to produce maximum heating effect by a small capacity apparatus.

Other features of the present invention will be apparent by a few examples embodying the present invention as explained with reference to the accompanying drawings.

DETAILED DESCRIPTION OF THE INVENTION

Figure 1:
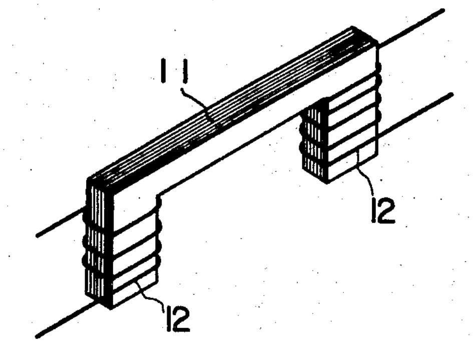
FIG. 1 is a perspective view showing the external configuration of one example of a magnetic inductor according to the invention.

In the descriptions mentioned hereinafter the ferromagnetic material designates reinforcing steel, steel frame, steel lathing, piano wire and the like, and the entire part of such a material may be buried in a concrete or a mortar or a mixture of a concrete and a mortar or one part thereof may be exposed.

Explanation will be made hereinafter on the case wherein the reinforcing steel in the ferro-concrete is heated by using a magnetic inductor consisting of a magnetic inductor iron core and an exciting coil to destroy the concrete or the like in which the ferromagnetic material exists. In the drawings, reference numeral 11 designates a magnetic inductor iron core, and 12 an exciting coil. FIG. 2 shows a state where the magnetic inductor is in contact with the surface of the concrete or the like and the ferromagnetic material (in this case, a round reinforcing steel bar) present in the interior thereof is set as a part of the magnetic circuit. In FIG. 2, reference numeral 13 designates a concrete or the like, 14 a round reinforcing steel bar, 15 a magnetic flux (hereinafter referred to as effective magnetic flux) passing through portions to be heated of the magnetic inductor and the reinforcing steel, 16 a leaked magnetic flux which does not pass through portions to be heated of the reinforcing steel, 17 a leaked magnetic flux similar to one designated by numeral 16, 18 and 19 inner side solid angle portions forming the shortest distance of two magnetic poles in contact with the surfaces of portions to be destroyed, 20 outer side solid angle portions, 21 and 22 starting and ending positions of winding of the exciting coil at the time when it is would around leg parts of the two magnetic poles, 23 and 24 areas where the reinforcing steel is heated, i.e. surfaces of the round reinforcing steel bar closest to the surfaces of concrete or the like. The exciting coil is wound in parallel in FIG. 1 and in series in FIG. 2. However, it has no particular meaning.

In FIG. 2, when a current is flowed to the exciting coil, a magnetic flux is generated. Further, said coil is tightly wound so that no large gap is produced between windings so as to prevent the leakage of the magnetic flux and conduct it, and the winding width of the coil between the positions 21 and 22 is selected so as to fix a distance (for example, more than once) corresponding to the covering depth (distance from the point 23 or 24 to the surface of the concrete or the like) so that the leaked magnetic flux forming a circuit as shown by numeral 17 is not generated. Also, the distance between 18 and 19 is selected to one (for example, more than twice) corresponding to the covering depth of the concrete or the like so that the leaked magnetic flux 16 does not become large.

In FIG. 2, when an alternating current is flowed to the exciting coil 12, an alternating magnetic flux is generated. Since, as shown in the foregoing, the winding width of the exciting coil and the distance between the inner side solid angle portions of the magnetic pole are suitably selected, the magnetic flux does not almost leak and passes through the magnetic inductor, further passes through the concrete or the like and enters the reinforcing steel. When said magnetic flux reaches the lower part of the opposite magnetic pole along said reinforcing steel it becomes an effective magnetic flux which is conducted by the magnetic inductor and passes the interior of the concrete or the like and returns to the magnetic inductor and forms a circulating magnetic circuit. In this manner, since the magnetic inductor effectively operates, the ratio of the magnetic flux becoming effective becomes large.

In order to reduce the magnetic resistance of the concrete or the like in the magnetic circuit of the effective magnetic flux and elevate the heating effect of the ferromagnetic material, it is exceedingly effective to increase the distance between the outer side solid angle portion 20 and the inner side solid angle portion 18 in the same magnetic pole and the distance between said portion 20 and the inner side solid angle portion 19 or to increase the thickness of the iron core of the magnetic inductor thereby to increase the surface area of the magnetic pole facing the heated portion.

Figure 2:
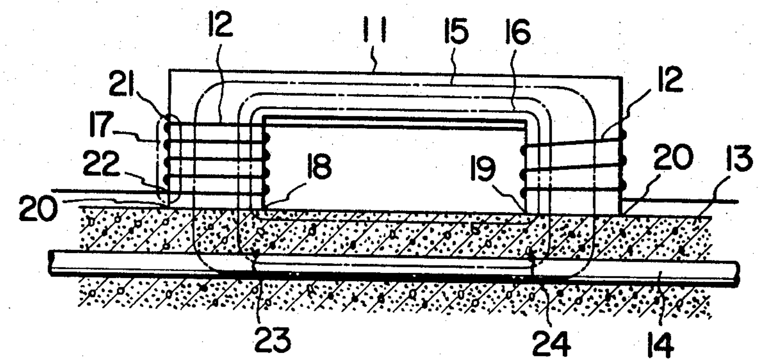
FIG. 2 is a front elevation showing the relationship between the magnetic inductor shown in FIG. 1 in the use and the magnetic flux in the magnetic circuit passing through a ferromagnetic material at a portion to be destroyed.
Figure 3:
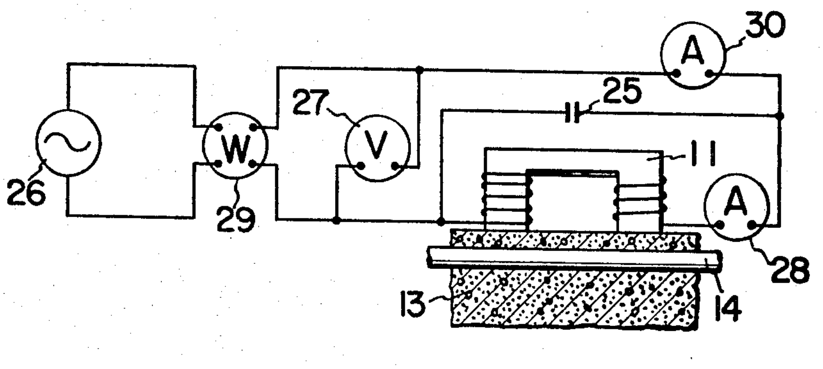
FIG. 3 is a connection diagram for measuring the power factor of the magnetic inductor connecting capacitors and the circuit at that time.

FIG. 3 is a connection diagram showing the connection between the magnetic conductor and capacitor shown in FIG. 1. In FIG. 3, reference numeral 25 designates a capacitor, 26 an AC power source, 27 a voltmeter for measuring terminal voltages of the capacitor and the exciting coil, 28 an ammeter for measuring the current of the exciting coil, 29 a wattmeter for measuring the active power consumed through the exciting coil, 13 a concrete, and 14 a round reinforcing steel bar. Reference numeral 30 designates an ammeter for measuring the current supplied to a parallel circuit consisting of the capacitor and the exciting coil.

Figure 4:
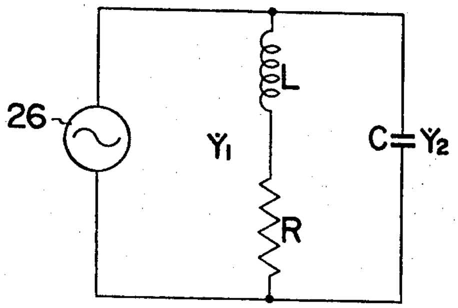
FIG. 4 is a circuit diagram shown by components representing electrical characteristics of the circuit shown in FIG. 3.
Figure 5A:
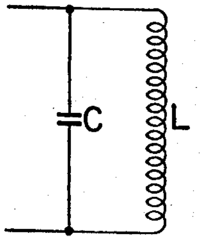
FIGS. 5 (A), (B), (C) and (D) are respectively connection diagrams showing one example of connection between capacitors and coils.
Figure 5B:
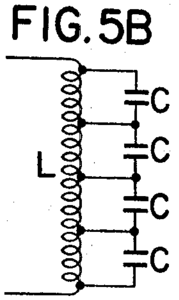
Figure 5C:
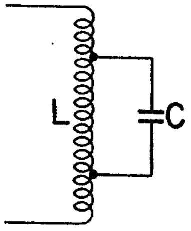
Figure 5D:
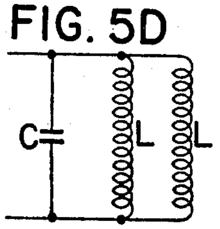

When the connection diagram of FIG. 3 is represented by the components of the electric circuit, it will become as shown in FIG. 4. In FIG. 4, R denotes the resistance of the coil and a resistance including a value converted into a primary side exciting coil using the reinforcing steel in the concrete as the secondary side resistance, and L is an inductance consisting of the coil and the reinforcing steel. At that time, the capacitor may be connected in parallel to all the coils. For example, in FIG. 5, (A) shows the case where the capacitor is connected to all the exciting coil in parallel, (B) and (C) show respectively the case where the capacitor is connected in parallel to a part of the coil, and (D) shows the case where the capacitor is connected in parallel to the coils in parallel. However, a connection where the capacitor is connected substantially to all the coil is desirable.

In the circuit shown in FIG. 4, if the admittance of the coil circuit is denoted by $Y_1$, the following equation can be satisfied.

$$\dot{Y}_1 = 1/(R+jWL) = [R/(R^2-W^2L^2)]j[WL/(R^2+W^2L^2)]$$

and if the admittance at the capacitance side is denoted by $Y_2$, the following equation can be satisfied.

$$\dot{Y}_2 = jWC$$

When Wo satisfies the equation, $$WoL/(R+W^2oL) = WoC$$

the absolute values of imaginery number portions of $\dot{Y}_1$ and $\dot{Y}_2$ become equivalent in case where frequency is *fo* and the magnification of a current *I* in this case becomes $$I = E\frac{R}{R^2+W^2oL^2} = ER\frac{C}{L}.$$

In the above equation *E* is the power voltage. When the value of *R* is small, *I* becomes extremely small.

As an embodiment of the present invention, the magnetic inductor shown in FIG. 2 connected in parallel to the exciting coil wherein the distance between 18 and 19 is 25 cm, that between 21 and 22 is 10 cm, that between 18 and 20 is 10 cm, and the thickness of the iron core of the magnetic inductor is 2 cm is connected in quite the like manner as the circuit shown in FIG. 3, and said magnetic inductor is wound 120 times. The reinforcing steel in the concrete is a round steel bar having a diameter of 22 mm and a covering depth of 3.5 cm.

The capacitor having a nominal values of 30 $\mu$F, 500 W, and 400 Hz was connected to the coil. Power was obtained by a motor-generator and its frequency was 400 c/s.

When a voltage of 430 V was impressed on the terminals of the exciting coil and the capacitor, the ammeter 28 indicated 43 A, the ammeter 30 indicated 5.7 A and the wattmeter 29 indicated 2.02 KW. Under the quite same condition, when the capacitor 25 was disconnected from the circuit shown in FIG. 3, both the ammeters 28 and 30 indicated 43 A and the wattmeter indicated 2.02 KW. The result of the case of connecting the capacitor and that of the case of not connecting the same are shown in Table 1.

TABLE 1

| | Terminal voltage of exciting coil (V) | Supplied current (A) | Exciting coil current (A) | Active power (KW) | Power factor (%) |
|---|---|---|---|---|---|
| With capacitor | 430 | 5.7 | 43 | 2.02 | 10.9 |
| Without capacitor | 430 | 43 | 43 | 2.02 | 82.5 |

As apparent from the Table 1, the supplied current in the case of connecting the capacitor to the coil is 5.7 A and that in the case of not connecting the capacitor thereto is 43 A, and quite the same heating effect and destructive effect were obtained.

Accordingly, if the capacitor is used, the power source and the lead wire of about 1/7 are sufficient.

Figure 6:
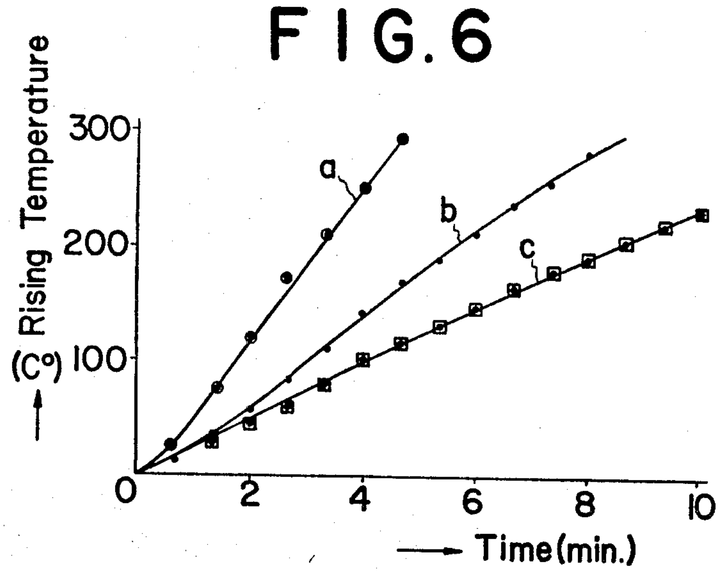
FIG. 6 is a diagram showing the relationship between the time when a reinforcing steel buried in a concrete has been heated by a device utilizing the method of the present invention and the raised temperature of the reinforcing steel.

The concrete used in the above mentioned embodiment of the present invention had a water-cement ratio of 60 percent and was cured for 4 weeks in the air. The rising temperature of the reinforcing steel is shown in FIG. 6 at the time when a current of 400 c/s, 60 A is flowed to the exciting coil by use of a magnetic inductor, and the magnetic flux is passed through the concrete having a covering depth of 4 cm. The temperature of the reinforcing steel buried in the concrete was measured by an alumel-chromel thermoelectric couple. In FIG. 6 *a* denotes the relationship between the time and the rising temperature of the reinforcing steel having a diameter of 9 mm, *b* denotes that of the reinforcing steel having a diameter of 16 mm, and *c* that of a diameter of 22 mm.

According to the result of the experiment, in the case of ferro-concrete having a covering depth of 4 cm, when the temperature of the reinforcing steel is raised to above 150° C. within 20 minutes, cracks occur in the heated portion, irrespective of the diameter of the reinforcing steel, from the contact portions of the concrete and the reinforcing steel to the surface of the concrete, and the adhesive power of the concrete with the reinforcing steel vanishes and the destruction thereof becomes exceedingly easy.

When the temperature of the reinforcing steel having a covering depth of 4 cm has been raised up to 150° C. within 10 minutes, the residual adhesive power was measured by a tension tester. The result thus obtained is shown in Table 2.

TABLE 2

| Diameter of reinforcing steel (mm) | Nonheated sample: Measuring times | Nonheated sample: Average adhesive power ($kg/cm^2$) | Heated sample: Measuring times | Heated sample: Average adhesive power ($kg/cm^2$) |
|---|---|---|---|---|
| 9 | 5 | 28.1 | 15 | 1.13 |
| 16 | 5 | 29.4 | 15 | 0.65 |
| 22 | 5 | 29.3 | 15 | 0.46 |

The concrete in which the reinforcing steel was heated and thereby the adhesive power was exceedingly reduced was easily destroyed by merely hammering.

Figure 8:
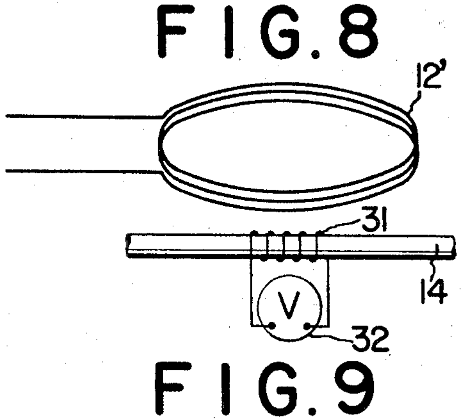
FIG. 8 is a perspective view having an intention similar to that of FIG. 7 in the other case.

FIG. 8 shows a circular exciting coil 12′ having the length of 25 cm used for comparison with the present invention.

Figure 7:
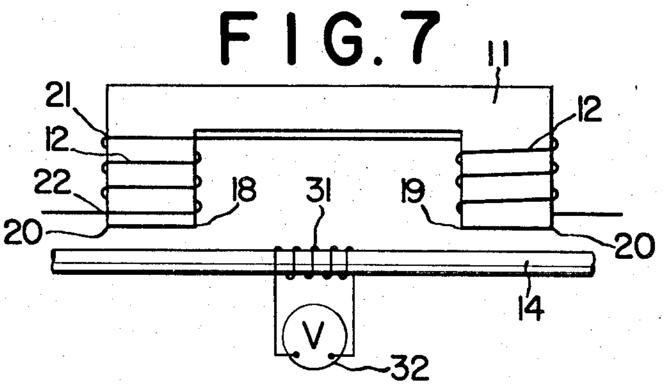
FIG. 7 is a front elevation showing an electrical connection at the time when the amount of the generated magnetic flux passing through the reinforcing steel in the concrete or the like at the portion to be destroyed.

Comparison was made how much effective magnetic flux can be introduced into the reinforcing steels having diameters of 9 mm, 16 mm and 22 mm, respectively, when the magnetic inductor shown in FIG. 7 and the circular coil 12′ shown in FIG. 8 are set on the concrete having a covering depth of 4 cm. In this case, reference numeral 31 designates a search coil for detecting the amount of the alternating magnetic flux passing through the reinforcing steel as an induction voltage, and 32 a vacuum tube voltmeter for measuring the search coil induction voltage.

As a result of measuring and comparing the rate of the magnetic flux generated in the exciting coil passing through the reinforcing steel using a power source of the same frequency (5 KC) in cases of FIGS. 7 and 8, it was found that in FIG. 7 in which consideration is paid on the magnetic circuit the rate of the generated magnetic flux becoming effective was 8.79 percent in the case of the reinforcing steel having a diameter of 9 mm, 12.1 percent in the case of that having a 16 mm diameter, and 16.1 percent in the case of that having a 22 mm diameter. Whereas, in the circular exciting coil 12′ in FIG. 8 where no consideration is paid on the magnetic circuit, the search coil induction voltage was almost zero in the case of the reinforcing steel of any diameter, and therefore it was impossible to measure. The result of the measurement is shown in Table 3.

TABLE 3

| Diameter of reinforcing steel (mm) | Magnetic flux efficiency (%) FIG. 3 | FIG. 4 |
|---|---|---|
| 9 | 8.79 | |
| 16 | 12.1 | |
| 22 | 16.1 | |

From this table it is found that the present invention had an exceedingly excellent magnetic induction efficiency. However, when the distance between 18 and 19 and that between 21 and 22 are selected less than two times the covering depth of the concrete or the like, i.e., in the case of FIG. 7 in which the covering depth is 4 cm, when the distance is less than 8 cm, the leaked magnetic fluxes 16 and 17 in FIG. 2 become large, and therefore it is very effective to make the distance between 18 and 19 and that between 21 and 22 more than two times the covering depth.

Figure 9:
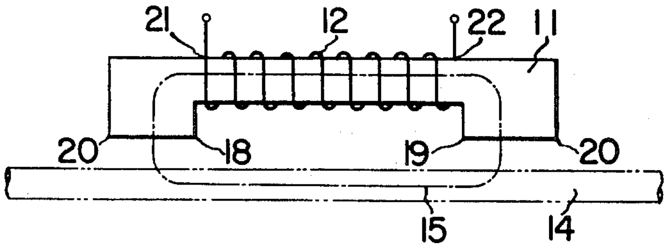
FIG. 9 is a front elevation showing a modification of one application of the magnetic inductor.
Figure 10:
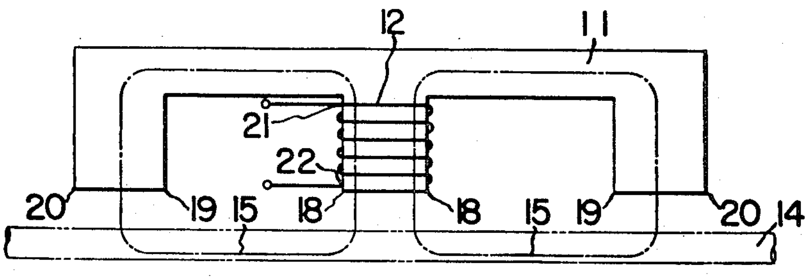
FIG. 10 is a front elevation showing other modification of the application of the magnetic inductor.

The magnetic inductor may assume the shapes as shown in FIGS. 9 and 10. In FIG. 9 it is characterized in that the exciting coil is wound around the saddle portion and the length of leg part is extremely shortened and according to circumstances the leg part is unnecessary. In FIG. 10 it is characterized in that a plurality of active magnetic circuits is constituted by an exciting coil.

The object can be sufficiently attained by use of the magnetic inductor singly but it is more effective if a plurality of magnetic inductors are used by setting them in parallel in aligning the polarities of the magnetic poles in the same direction.

When the method according to the present invention is employed together with the directly current applying method, disassembly of a concrete or the like becomes extremely easy. More specifically, when one end of column, beam, wall or the like is heated with a magnetic inductor and the covering portion is exfoliated thereby to cut exposed reinforcing steel, steel frame, lathing and the like, the concrete or the like which has become non-reinforced are easily pulled down. After it has been pulled down, a current is directly applied to the reinforcing steel, steel frame, lathing or the like at both ends of the concrete or the like to be destroyed using them as conductors and then heated, and thereafter the disassembly of the concrete or the like is carried out safely, easily and in noiseless manner.

We claim:

1. A device for electrically destroying a ferroconcrete body characterized in that a magnetic inductor iron core (11) having a shape of ⊓ consisting of two leg parts and connecting parts thereof is set closely to a round reinforcing steel bar (14) buried in a ferroconcrete body (13) and exciting coils (12,12) are wound around the leg parts of said iron core (11) thereby to pass a magnetic flux generated at said exciting coil (12) through said round reinforcing steel bar (14), and further said exciting coil (12) is connected to AC power source (26) in parallel together with a capacitor (25).

2. A device for electrically destroying a ferroconcrete body characterized in that a magnetic inductor iron core (11) having very short leg parts or no leg part and exciting coil (12) wound around central part is set closely to a round reinforcing steel bar (14) buried in a ferroconcrete body (13) thereby to pass a magnetic flux generated at said exciting coil (12) through said round reinforcing steel bar (14), and further said exciting coil (12) is connected to AC power source (26) in parallel together with a capacitor (25).

3. A device for electrically destroying a ferroconcrete body characterized in that a magnetic inductor iron core (11) having a shape of ⊓⊓ consisting of three leg parts and connecting parts thereof is set closely to a round reinforcing steel bar (14) buried in a ferroconcrete body (13) and an exciting coil (12) is wound around the central leg part of said iron core (11) thereby to pass a magnetic flux generated at said exciting coil (12) through said round reinforcing steel bar (14), and further said exciting coil (12) is connected to AC power source (26) in parallel together with a capacitor (25).

4. The method of destroying a ferroconcrete body formed of a concrete mass having ferromagnetic reinforcements embedded therein, said method comprising positioning an exciting coil very close to the surface of the ferroconcrete body nearest the embedded ferromagnetic reinforcements, applying an alternating electric current to the exciting coil to produce an alternating magnetic flux; and controlling the field of said magnetic flux by the use of a magnetic core for said exciting coil so that the magnetic flux passes mainly through the ferromagnetic reinforcements and raises the temperature of said ferromagnetic reinforcements to facilitate separation of the embedded reinforcement from its boundary concrete.

5. The method of destroying a ferroconcrete body formed of a concrete mass having ferromagnetic reinforcements embedded therein, said method comprising positioning an exciting coil very close to the surface of the ferroconcrete body nearest the embedded ferromagnetic reinforcements, applying an alternating electric current to the exciting coil to produce an alternating magnetic flux; connecting a capacitor in parallel with said exciting coil so as to reduce the needed alternating current magnitude; and controlling the field of said magnetic flux by the use of a magnetic core for said exciting coil so that the magnetic flux passes mainly through the ferromagnetic reinforcements and raises the temperature of said ferromagnetic reinforcements to facilitate separation of the embedded reinforcement from its boundary concrete.

6. The method of destroying a ferroconcrete body formed of a concrete mass having ferromagnetic reinforcements embedded therein, said method comprising positioning an exciting coil very close to the surface of the ferroconcrete body nearest the embedded ferromagnetic reinforcements; applying an alternating electric current to the exciting coil to produce an alternating magnetic flux; and controlling the field of said magnetic flux by the use of a magnetic core for said exciting coil so that the magnetic flux passes mainly through the ferromagnetic reinforcements; said controlling is achieved by selecting a magnetic core having at least two poles separated by a distance of about two times the distance between the surface adjacent said coil and the embedded ferromagnetic reinforcements.

7. A method as in claim 6, wherein the width of the coil around the core is selected to be at least two times the distance between the surface adjacent said coil and the embedded ferromagnetic reinforcements.

8. The method of destroying a ferroconcrete body formed of a concrete mass having ferromagnetic reinforcements embedded therein, said method comprising positioning an exciting coil very close to the surface of the ferroconcrete body nearest the embedded ferromagnetic reinforcements, applying an alternating electric current to the exciting coil to produce an alternating magnetic flux; connecting a capacitor in parallel with said exciting coil so as to reduce the required alternating current magnitude and controlling the field of said magnetic flux by the use of a magnetic core for said exciting coil so that the magnetic flux passes mainly through the ferromagnetic reinforcements; said controlling is achieved by selecting a magnetic core having at least two poles separated by a distance of about two times the distance between the surface adjacent said coil and the embedded ferromagnetic reinforcements.

9. A method as in claim 8, wherein the width of the coil around the core is selected to be at least two times the distance between the surface adjacent said coil and the embedded ferromagnetic reinforcements.

* * * * *